J. W. PRENTISS.
Grain Drill.

No. 26,615

Patented Dec. 27, 1859.

Witnesses:
A. Rose
Charles Kitchum

Inventor:
Josiah W. Prentiss

UNITED STATES PATENT OFFICE.

JOSIAH W. PRENTISS, OF PULTNEY, NEW YORK.

IMPROVEMENT IN SEEDING-MACHINES.

Specification forming part of Letters Patent No. 26,615, dated December 27, 1859.

*To all whom it may concern:*

Be it known that I, JOSIAH W. PRENTISS, of Pultney, in the county of Steuben and State of New York, have invented a new and useful Improvement in Seed-Drills; and I do hereby declare that the following is a full, clear, and exact description of the construction and operation of the same, reference being had to the annexed drawings, making a part of this specification, in which—

Figure 1:
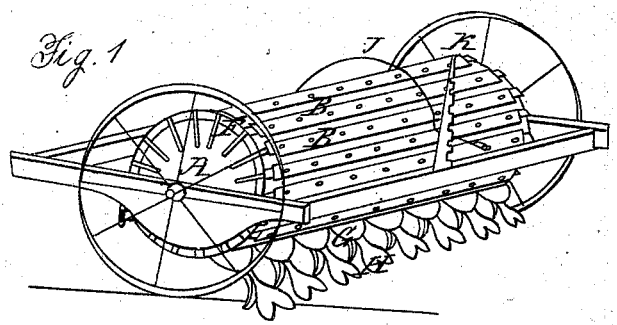
Figure 2:
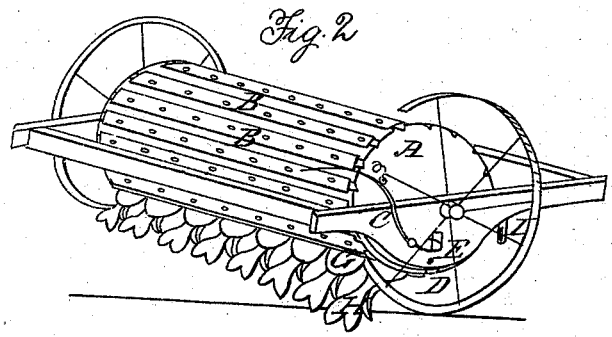
Figure 3:
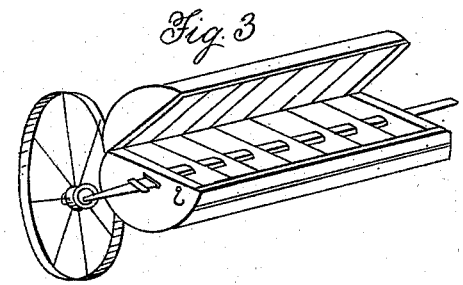

Figure 1 is a perspective view showing the rear and left-hand side of the machine. Fig. 2 is a perspective view showing the rear and right-hand side. Fig. 3 is a perspective view showing the inside of the seed-cylinder.

The letters of reference refer to the same parts in each figure.

The frame that holds the cylinder may be made of wood, as shown in the figures. The wheels are of the ordinary kind, as carriage-wheels. They may be both fastened to the axle with a ratchet that will allow the wheels to turn backward without turning the cylinder, as shown in Fig. 3, where the wheel is taken off to show the pawl and ratchet.

A is the cylinder, made of wood or metal, with the axle passing through the center and securely fastened to the heads of the cylinder. The cylinder has holes made in lines or rows to allow the seed to pass out when it is revolved. It is made in two parts and secured with hinges or otherwise, so that it may be opened to put the seed in.

B is one of a series of slides that covers the holes in the cylinder. It has holes that correspond with the holes in any line in the cylinder. They are secured to the outside of the cylinder by clasps that will allow them to slide endwise. At one end they rest against the springs F. The other end is cut off in an angular direction to allow them to be easily acted upon by the tilting catch which moves them, so that the quantity of seed required may pass out.

C is a lever attached to the side of the frame and made to actuate the tilting catch.

D is a tilting-catch placed on the inside of the frame, and is made to be raised or lowered at pleasure, so that when the machine is wanted to deliver the seed the catch may be raised, so that the slides B will remain over or cover the holes in the cylinder during the entire revolution.

E is an adjusting-screw that is used to adjust the catch D, thereby regulating the quantity of seed.

F is one of a series of springs that hold the slides B in position and allow them to be moved by the catch D and replace them after being moved.

G is one of a series of drilling-instruments, made so as to receive the seed as it drops from the cylinder and allow the same to pass through it into the place prepared in the earth by the under side of the drilling-instrument. The lower part of the instrument is made pointed, so as to pierce the ground and not catch to any obstacle that is fast in its way, but will pass over it. The forward end is as a spring, or a spring may be attached. This spring is secured to the forward part of the frame. These instruments are placed directly under the holes of the cylinder.

H is a drag attached to the drilling-instrument to cover the seed after it is dropped to the ground.

I is a bar placed over the springs of the drills, and each instrument or spring is clasped to it, so that by raising the bar the whole of the drills will be raised at the same operation, and each drill may pass over any obstacle, without raising the whole or any part of them, by means of the spring.

J is a lever secured to the main frame at one end. The other end is held by the adjusting-post K. Forward of the cylinder the bar I is connected in such manner that the drills may be raised or lowered and much or little stress used to force the drills into the ground, according to the condition of the soil or depth the seed is to be deposited in the ground.

What I claim as my invention, and desire to secure by Letters Patent, is—

The divided revolving cylinder A and slides B, when made, arranged, and operated as set forth, in combination with the peculiar-formed spring-teeth G, with their cups, when made and used substantially as specified.

JOSIAH W. PRENTISS.

Witnesses:
 ALFRED ROSE,
 CHARLES KETCHUM.